US009666377B2

(12) United States Patent
Kim et al.

(10) Patent No.: US 9,666,377 B2
(45) Date of Patent: May 30, 2017

(54) INTERNAL CURRENT COLLECTION STRUCTURE OF THERMAL TO ELECTRIC CONVERTING CELL AND MANUFACTURING METHOD OF THE SAME

(71) Applicant: KOREA INSTITUTE OF ENERGY RESEARCH, Daejeon (KR)

(72) Inventors: Sun-Dong Kim, Daejeon (KR); Sang-Kuk Woo, Daejeon (KR); Se-Young Kim, Seongnam-si (KR); Jong-Hoon Joo, Chungcheongbuk-do (KR); In-Sub Han, Daejeon (KR); Doo-Won Seo, Daejeon (KR); Min-Soo Suh, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 448 days.

(21) Appl. No.: 13/961,911

(22) Filed: Aug. 8, 2013

(65) Prior Publication Data
US 2015/0010787 A1 Jan. 8, 2015

(30) Foreign Application Priority Data
Jul. 3, 2013 (KR) .......................... 10-2013-0077637

(51) Int. Cl.
*H02N 3/00* (2006.01)
*H01G 9/21* (2006.01)
(52) U.S. Cl.
CPC .................. *H01G 9/21* (2013.01); *H02N 3/00* (2013.01); *Y10T 29/417* (2015.01)

(58) Field of Classification Search
CPC .................................. H01G 9/21; H02N 3/00
See application file for complete search history.

(56) References Cited

U.S. PATENT DOCUMENTS

| 4,220,692 A | * | 9/1980 | Hunt | H01G 9/21 429/104 |
| 4,808,240 A | * | 2/1989 | Sievers | H01G 9/21 136/202 |
| 4,835,071 A | * | 5/1989 | Williams | H01M 10/3918 429/104 |
| 4,871,626 A | * | 10/1989 | Williams | H01G 9/21 429/104 |
| 5,089,054 A | * | 2/1992 | Sievers | H01G 9/21 136/200 |

FOREIGN PATENT DOCUMENTS

KR  10-2011-0138862 A  12/2011

* cited by examiner

*Primary Examiner* — Allison Bourke
(74) *Attorney, Agent, or Firm* — Revolution IP, PLLC

(57) ABSTRACT

Disclosed is an internal current collection structure of a tubular thermal to electric converting cell including an internal electrode, a solid electrolyte and an external electrode. The internal current collection structure includes: a first current collector which closely contacts with the internal electrode of the tubular thermal to electric converting cell; a second current collector which fixes the first porous current collector to the inside of the tubular thermal to electric converting cell and causes the first current collector to be in close contact with the internal electrode; and a lead wire which is a conductive medium and is located between the first current collector and the second current collector.

12 Claims, 5 Drawing Sheets

INTERNAL CURRENT COLLECTION STRUCTURE OF THERMAL TO ELECTRIC CONVERTING CELL AND MANUFACTURING METHOD OF THE SAME

CROSS REFERENCE TO PRIOR APPLICATIONS

This application claims priority under 35 U.S.C. §119 to Korean Patent Application No. 10-2013-0077637, filed on Jul. 3, 2013, which is hereby incorporated by reference in its entirety.

BACKGROUND

Field

The present invention relates to an internal current collection method that uses an internal current collection structure including a plurality of current collectors, among methods for collecting current in a tubular thermal to electric converting cell. The internal current collection method of the thermal to electric converting cell includes a porous current collector which easily contacts with an internal electrode of the thermal to electric converting cell and a lead wire which is a conductive medium and fastened to the porous current collector.

Description of Related Art

Alkali Metal Thermal to Electric Converter (AMTEC) is a thermal to electric power generator capable of generating electrical energy from thermal energy.

When a temperature difference is given to both ends of an ionically conductive Beta-Alumina Solid Electrolyte (BASE), Na charged in the cell is ionized into Na+ due to the vapor pressure difference of Na and is diffused from anode to cathode through the electrolyte, and then is neutralized.

In this case, low voltage and high current are generated. So, when the cells are modularized by being connected in series or in parallel, a large amount of electric power can be generated.

The development of AMTEC technology has started for the purpose of an electric power source for space. The AMTEC has a high power density per unit area and high efficiency, and maintains stability.

The AMTEC uses a variety of heat sources, for example, solar energy, fossil fuel, waste heat, terrestrial heat, nuclear reactor, etc. The AMTEC is comprised of electric power generation cells capable of generating electricity without using a driver such as a turbine, a motor or the like, so that it can directly generate electricity from a portion contacting with the heat. When the AMTEC is formed in the form of a module in series or in parallel, a great amount of electricity of several KW to several hundredths MW can be generated.

The form of waste heat includes flue gas, exhaust air, waste hot water, waste steam and the like. Sensible heat and reaction heat of a product of the production process are also classified into the waste heat. In the collection of the waste heat, there are a variety of forms, standards and materials, etc., of a heat exchanger which is applicable in accordance with the temperature of the waste heat, the condition of flow rate of the waste heat and whether or not the waste heat includes a corrosive material.

A device using the waste heat includes a waste heat collector, an electric heat exchanger, a heat pipe type heat exchanger and the like. In a special case, a separate collection system is considered.

The AMTEC is capable of improving the efficiency by directly generating high-quality electricity from the heat source. Therefore, the AMTEC is now issued as a promising technology replacing the existing power generation technologies, for example, hydro power generation, terminal power generation, nuclear power generation, tidal power generation, wind power generation and so on.

One of the features of the AMTEC power generation technology is to have a structure simpler than that of other thermoelectric conversion devices and to have high energy conversion efficiency.

In particular, compared with a solar thermal power plant, the AMTEC does not require a mechanical driving part like a turbine, etc. Compared with a thermoelectric device, the AMTEC can be applied to a high-capacity, high-efficiency system.

The process of generating electricity in the AMTEC will be specifically described. After the state of Na vapor is changed into a vapor state in a high temperature and high pressure evaporator by a heat source, Na+ passes through beta-alumina solid electrolyte (BASE), and free electrons return to a cathode through an electric load from an anode, and then are recombined with ion generated from the surface of a low temperature and low pressure BETA and then is neutralized. Electricity is generated during this process.

The vapor pressure of Na plays the most significant role in a thermal to electric power generator as an energy source or a driving force which generates electricity. Also, free electrons generated during a process in which Na passes through the solid electrolyte due to a concentration difference and temperature difference of a working fluid are collected through electrodes, so that electricity can be generated.

The beta-alumina and Na super-ionic conductor (NASICON) may be used as the solid electrolyte.

However, the NASICON has a problem in its stability of crystal structure when it is exposed to high temperature for a long time.

The beta-alumina includes two kinds of beta'-alumina and beta"-alumina.

The beta"-alumina has a more improved layer structure so that the conductivity of the Na+ ion is much better. Therefore, the beta"-alumina is now generally used.

A process is repeated in which the neutral Na vapor is condensed by being cooled on the inner surface of a low pressure condenser and is transferred to an evaporator by a capillary wick, and then is changed into a vapor state again. Generally, the temperature of the evaporator is in a range of 900 K to 1,100 K, and the temperature of the condenser in a range of 500 K to 600 K.

It is possible for the efficiency of the thermal to electric power generation of the AMTEC to be up to 40%. The AMTEC has a high power density and a simple structure without a separate driving part.

A tubular cell used in the thermal to electric converting cell of the AMTEC is generally composed of an internal electrode, an electrolyte, and an external electrode. Here, for the purpose of collecting electricity generated by the cell, the internal electrode and the external electrode are required to be electrically connected to each other by means of a conductor. However, the internal electrode formed on the inner surface of the tubular cell is technically difficult to electrically connect.

With regard to a tubular solid oxide fuel cell (SOFC), a cylindrical current collector has been used in the past. However, with regard to the AMTEC, a current collector thereof has not been clearly disclosed yet.

The conventional technology increases the weights of the unit cell and system and requires a high manufacturing cost.

This may be a factor that reduces an economical efficiency and power density per unit weight.

PRIOR ART DOCUMENT

In the publication of Korean Patent Application No. 10-2011-0138862, disclosed are a porous polymer web current collector and a method for manufacturing the same. More particularly, after the porous polymer web having a three dimensional network structure is hot-pressed, a conductive film is formed. Accordingly, the porous polymer web current collector has high electrical conductivity and well-developed macro-pores, to thereby allowing electrolytes to easily penetrate. The porous polymer web current collector includes the porous polymer web which is made of nano-fiber obtained by emitting fiber forming polymer and has micro pores, and the conductive film which is formed by the deposition of metal so as to grant conductivity to the porous polymer web. However, there still remain problems in the method for easily collecting electricity without loss at a high temperature.

SUMMARY

Technical Problem

In order to collect electricity in the thermal to electric converting cell included in the Alkali Metal Thermal to Electric Converter (AMTEC), an anode generating electrons is commonly formed on the internal electrode of the Beta-Alumina Solid Electrolyte (BASE) tube, and the external electrode of the BASE tube is used as a cathode where Na+ ion is recombined with the electron and then is reduced into neutral Na. Also, it is required that the electrodes collect respectively the electricity and configure a circuit through a wire. During this process, the external electrode collects easily the electricity in the way of winding the electrode by using a metallic mesh and wire, however, the internal electrode has difficulty in easily collecting the electricity without loss.

Technical Solution

One aspect of the present invention is an internal current collection structure of a tubular thermal to electric converting cell including an internal electrode, a solid electrolyte and an external electrode. The internal current collection structure includes a first current collector which closely contacts with the internal electrode of the tubular thermal to electric converting cell; a second current collector which fixes the first porous current collector to the inside of the tubular thermal to electric converting cell and causes the first current collector to be in close contact with the internal electrode; and a lead wire which is a conductive medium and is located between the first current collector and the second current collector.

The current collector is connected to the wire in the form that the lead wire is fastened to the second current collector.

Advantageous Effect

The present invention provides an internal current collection method that uses an internal current collection structure including a plurality of current collectors, among methods for collecting current in a tubular thermal to electric converting cell.

Through the internal current collection method of the thermal to electric converting cell, the current collector of the internal current collection structure comes in close contact with the internal electrode of the thermal to electric converting cell, and the lead wire which is a conductive medium and is connected to the current collector can be easily fastened. Accordingly, it is possible to overcome the difficulties of a conventional internal current collection.

The method for fastening the lead wire includes various methods, for example, a welding method, a knotting method and the like.

DETAILED DESCRIPTION

Figure 1:
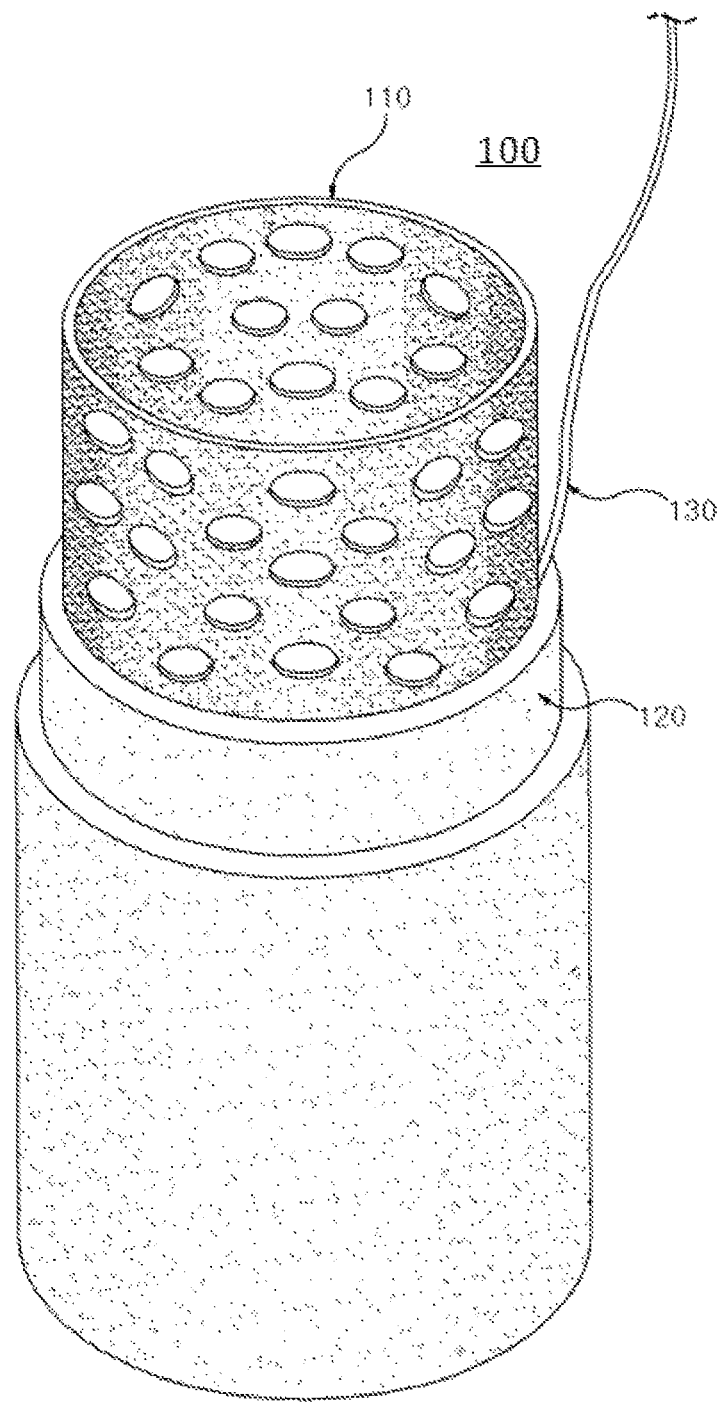
FIG. 1 shows an internal current collection structure of the present invention.
Figure 2:
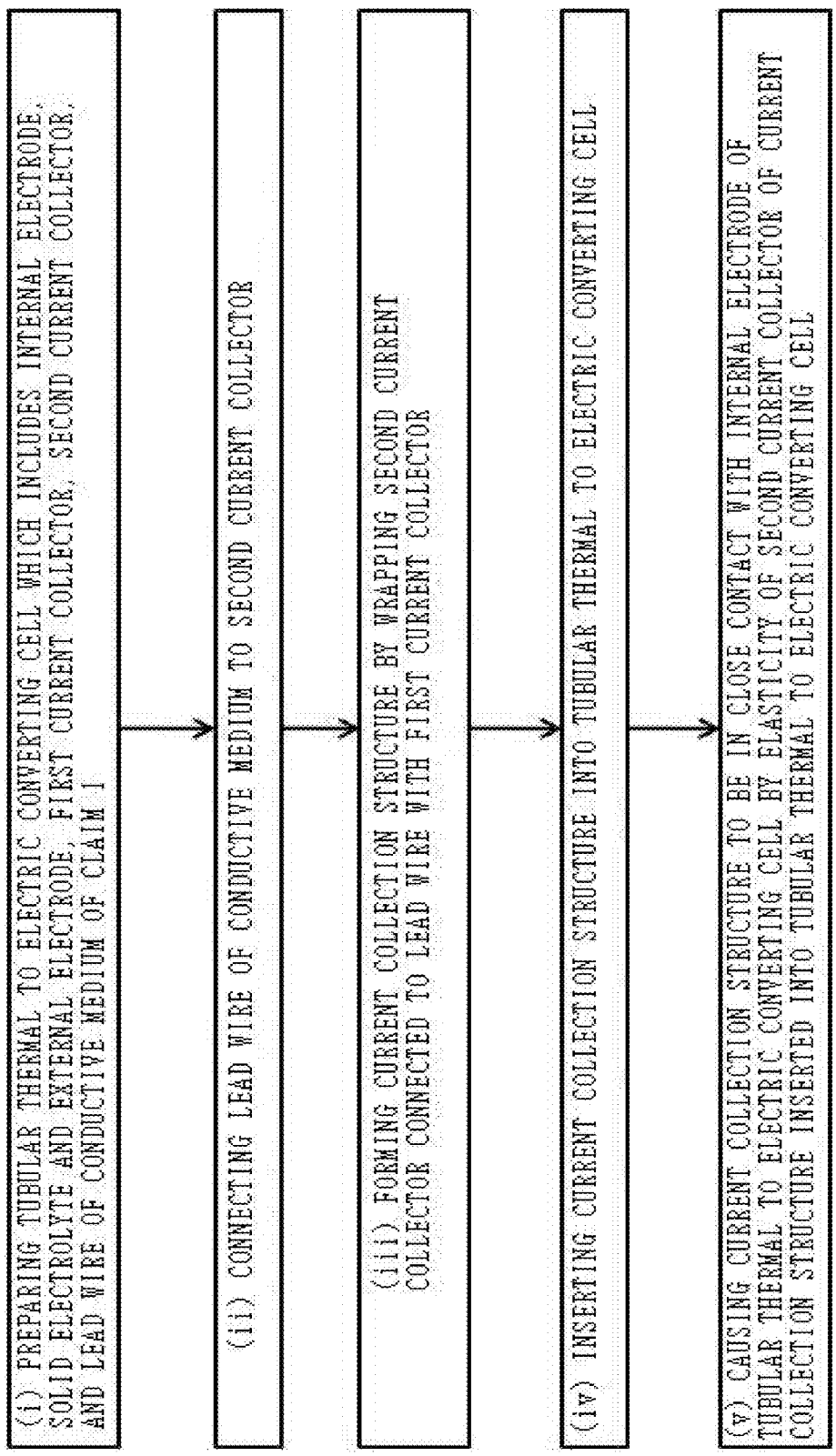
FIG. 2 shows a method for manufacturing the internal current collection structure of the present invention.
Figure 3:
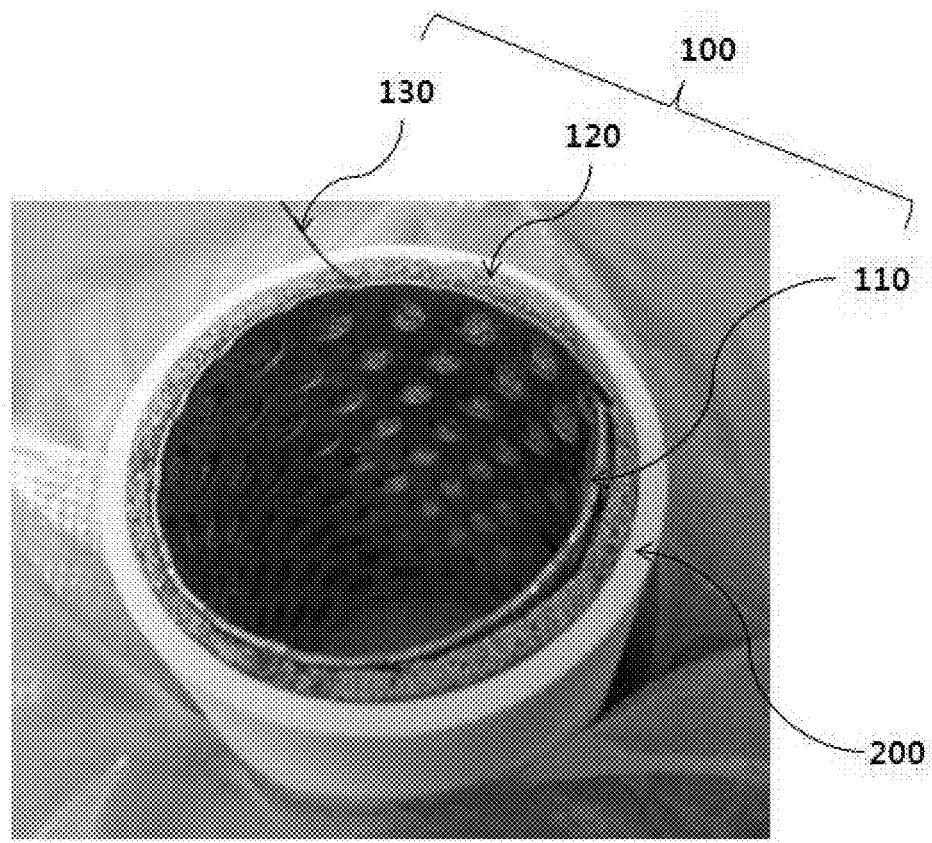
FIG. 3 shows an internal current collection structure according to an embodiment of the present invention.
Figure 4:
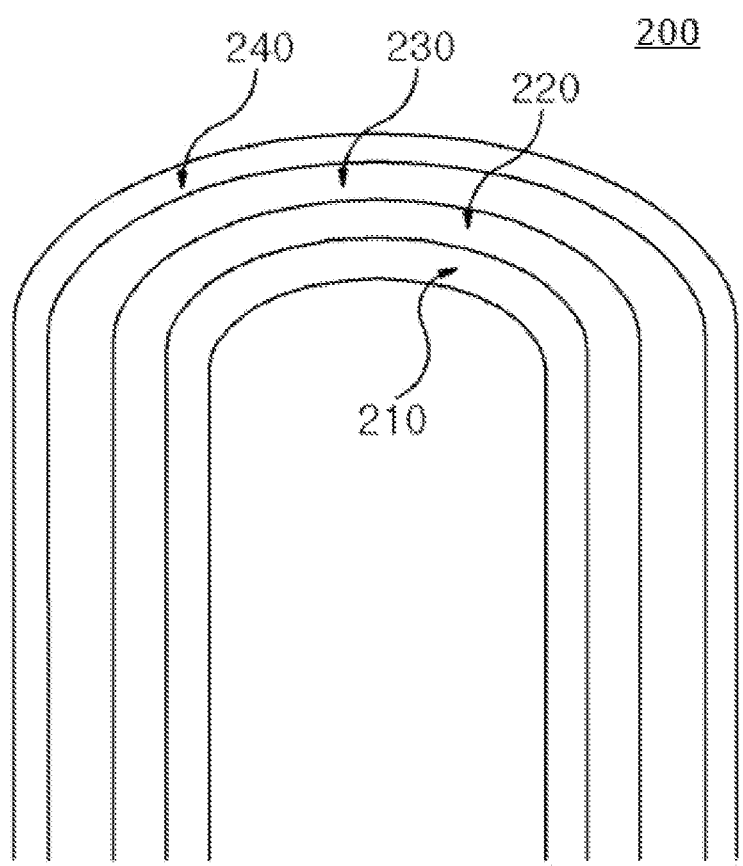
FIG. 4 shows a tubular thermal to electric converting cell of the present invention.
Figure 5:
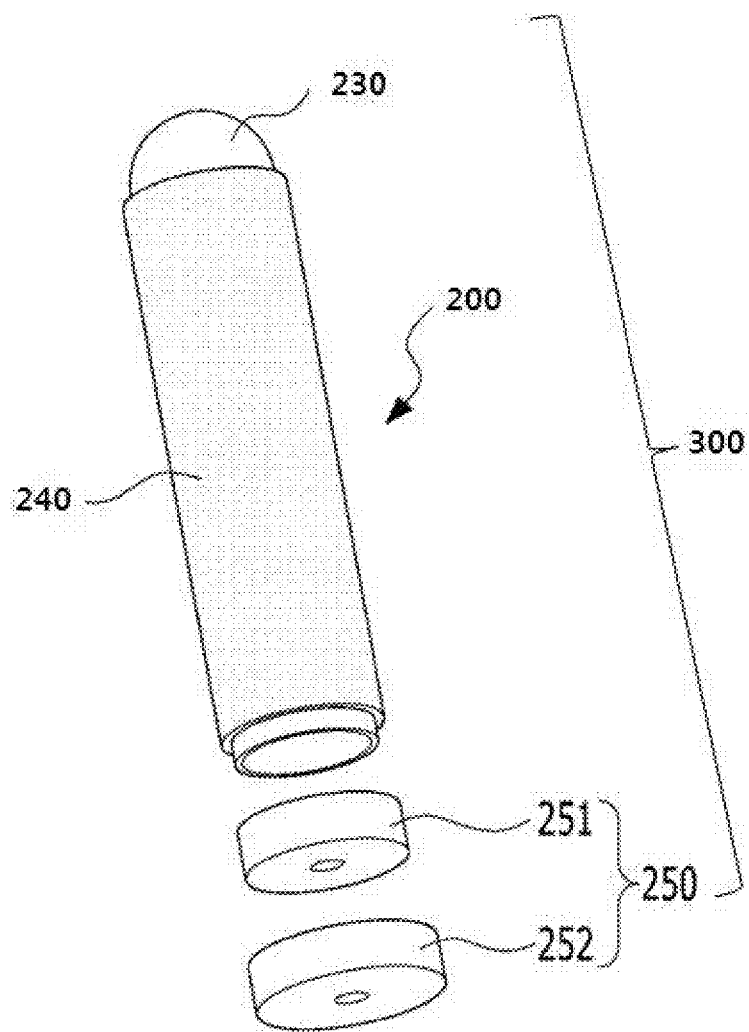
FIG. 5 shows an Alkali Metal Thermal to Electric Converter (AMTEC) cell according to the embodiment of the present invention.

FIG. 1 shows an internal current collection structure of the present invention. FIG. 4 shows a tubular thermal to electric converting cell of the present invention. According to the FIG. 1 and FIG. 4, an electric converting cell 200 may an internal electrode 210, a solid electrolyte 230, and an external electrode 240, and an internal current collection structure 100 may include a first current collector 120 which closely contacts with the internal electrode of the tubular thermal to electric converting cell 200, a second current collector 110 which fixes the first current collector 120 to the inside of the tubular thermal to electric converting cell 200 and causes the first current collector 120 to be in close contact with the internal electrode 210, and a lead wire 130 which is a conductive medium and is located between the first current collector 210 and the second current collector 110.

It is desirable that the first current collector 120 has a porous structure and includes at least any one selected from the group of consisting of Ni, Ta, Mo, Ti, W, Cu, Fe, Cr, Au, Ag, Pt, Al, Mn, Hg, Ar, Sn, Zn, Li, Pd, V, C, Ge, Rh and Ir. However, there is no limit to this.

For example, the first current collector 120 may be implemented in a porous structure having a felt shape.

It is desirable that the second current collector 110 includes at least any one selected from the group consisting of Ni, Ta, Mo, Ti, W, Cu, Fe, Cr, Au, Ag, Pt, Al, Mn, Hg, Ar, Sn, Zn, Li, Pd, V, C, Ge, Rh and Ir. However, there is no limit to this.

It is desirable that the second current collector 110 is made of a metal having elasticity and conductivity and has a hole formed therein.

For example, the second current collector 110 may be implemented in the structure formed by rolling a quadrangular metal surface having holes in the form of a cylindrical shape with an empty interior.

The size, number, shape and the like of the holes may be varied according to the tubular thermal to electric converting cell to be manufactured.

The second current collector 110 is made of a metal having elasticity and conductivity and may be implemented in the structure formed by rolling a quadrangular metal surface having holes.

It is desirable that the solid electrolyte 230 is any one of beta-alumina solid electrolyte and Na super-ionic conductor (NASICON) solid electrolyte. However, the solid electrolyte 230 is not limited to this.

The beta-alumina includes two kinds of beta'-alumina and beta"-alumina.

The beta"-alumina has a more improved layer structure so that the conductivity of the Na+ ion is much better. Therefore, the beta"-alumina is now generally used.

It is desirable that the internal electrode 210 and the external electrode 240 include at least any one selected from the group consisting of Mo, Ni, Al, PtW, RhW, TiC, TiN, SiN, RuO, $Ru_2O$, and $Rh_2W$.

The tubular thermal to electric converting cell 200 may include a tubular metal support 220, an internal electrode 210 formed on the inner surface of the metal support 220, a solid electrolyte 230 formed on the outer surface of the tubular metal support 220, and an external electrode 240 formed on the surface of the solid electrolyte 230.

The metal support 220 and the internal electrode 210 formed on the inner surface of the metal support 220 may be integrally formed. That is, the internal electrode 210 functioning as the metal support 220 may be formed and used.

In the method for manufacturing the internal current collection structure 100 of the tubular thermal to electric converting cell 200 including the internal electrode 210, the solid electrolyte 230, and the external electrode 240, the method may include preparing the tubular thermal to electric converting cell 200 which includes the internal electrode 210, the solid electrolyte 230 and the external electrode 240, the above-mentioned first current collector 120, the second current collector 110, and the lead wire 130, i.e., a conductive medium; connecting the lead wire 130 of the conductive medium to the second current collector 110; forming the current collection structure by wrapping the second current collector 110 connected to the lead wire 130 with the first current collector 120; inserting the current collection structure 100 into the tubular thermal to electric converting cell 200; and causing the current collection structure 100 to be in close contact with the internal electrode 210 of the tubular thermal to electric converting cell 200 by the elasticity of the second current collector 110 of the current collection structure 100 inserted into the tubular thermal to electric converting cell 200.

In the connection of the lead wire 130 of the conductive medium and the second current collector 110, it is desirable that the lead wire 130 is fastened to the hole of the second current collector 110.

A method for fastening the lead wire 130 to the hole of the second current collector 110 is to form a knot structure on the lead wire 130 and to jam the knot structure in the hole of the second current collector 110.

Also, the lead wire 130 may be fastened to the second current collector 110 by using a welding method.

As described above, it is possible to fasten the lead wire 130 to the second current collector 110 by using various methods including the conventional method.

The current collection structure 100 is closely contacted with the internal electrode 210 of the tubular thermal to electric converting cell 200 by the elasticity of the second current collector 110 of the current collection structure 100 inserted into the tubular thermal to electric converting cell 200, so that it is possible that the first current collector 120 of the internal current collection structure 100 comes in close contact with the internal electrode 210 of the thermal to electric converting cell.

The current collection structure 100 may be closely contacted with the internal electrode 210 of the tubular thermal to electric converting cell 200 by the elasticity of the second current collector 110. Even when the second current collector 110 has no elasticity, the current collection structure 100 can be closely contacted with the internal electrode 210 of the tubular thermal to electric converting cell 200 even by controlling the sizes of the second current collector 110 and the tubular thermal to electric converting cell 200

An Alkali Metal Thermal to Electric Converter (AMTEC) cell 300 may include the tubular thermal to electric converting cell 200 including the current collection structure 100 of the present invention, and a joiner 250 which is located under the tubular thermal to electric converting cell 200 and insulates and seals.

It is desirable that the joiner 250 has both open sides allowing air to pass therethrough and has a cylindrical shape with an empty interior.

The joiner 250 may include an insulating portion 251 having insulation, and a metal tube 252 for improving the joinability thereof.

With regard to a method for modularizing the AMTEC cell 300, the joiner 250 includes the insulating portion 251 and a sealing portion. The insulating portion 251 has a recess which is formed in a portion contacting with the tubular thermal to electric converting cell 200 and allows the tubular thermal to electric converting cell 200 to be inserted into the recess. After the tubular thermal to electric converting cell 200 is inserted into the recess, the sealing portion is formed in the rest space of the recess. The external electrode 240 of the tubular thermal to electric converting cell 200 is not inserted into the recess, and the lower portion of the internal electrode 210 or the solid electrolyte 230 is inserted and fixed into the recess. The sealing portion seals the recess so as not to allow the air to pass through the recess, and the insulating portion 251 is joined to the tubular thermal to electric converting cell 200. However, the method for modularizing the AMTEC cell 300 is not limited to this.

The insulating portion 251 may include at least any one of alpha alumina, anodized metal, and enamel coated metal.

It is desirable that the sealing portion includes at least any one of a carbon ring, a gold ring, a silver ring, and a brazing filler. It is desirable that the insulating portion 251 of the joiner 250 is joined by using at least any one of a welding method, an O-ring method, and a brazing method.

The present invention has been described with reference to the accompanying drawings. This is just one of various embodiments including the subject matter of the present invention and intends to allow those skilled in the art to easily embody the present invention. It is clear that the present invention is not limited to the above-described embodiments. Therefore, the scope of the present invention should be construed by the following claims. Without departing from the subject matter of the present invention, all the technical spirits within the scope equivalent to the subject matter of the present invention is included in the right scope of the present invention by the modifications, substitutions, changes and the like. Also, it is clear that some of the drawing configuration are intended for more clearly describing the configuration and are more exaggerated or shortened than the actual one.

What is claimed is:

1. An apparatus comprising:
   an electric converting cell comprising an internal electrode, a solid electrolyte, and an external electrode; and
   an internal collection structure comprising a first collector, a second collector, and a lead wire, the second collector comprising a plurality of holes therein;
   the second collector disposed within a perimeter of the first collector, the entire circumference of the second collector being disposed within the inside circumference of the first collector, and the first collector contacting with the internal electrode; and
   the lead wire disposed between the first collector and the second collector, the lead wire being fastened to one of the holes of the second collector.

2. The apparatus of claim 1, wherein the first collector has a porous structure and comprises at least any one selected from the group of consisting of Ni, Ta, Mo, Ti, W, Cu, Fe, Cr, Au, Ag, Pt, Al, Mn, Hg, Ar, Sn, Zn, Li, Pd, V, C, Ge, Rh and Ir.

3. The apparatus of claim 1, wherein the second current collector comprises at least any one selected from the group consisting of Ni, Ta, Mo, Ti, W, Cu, Fe, Cr, Au, Ag, Pt, Al, Mn, Hg, Ar, Sn, Zn, Li, Pd, V, C, Ge, Rh and Ir.

4. The apparatus of claim 1, wherein the second collector is made of a metal having characteristic of elasticity and conductivity, wherein the second collector is closely disposed within the inside perimeter of the first collector.

5. The apparatus of claim 1, wherein the solid electrolyte comprises any one of beta-alumina solid electrolyte and Na super-ionic conductor (NASICON) solid electrolyte.

6. The apparatus of claim 1, wherein the internal electrode and the external electrode comprise at least any one selected from the group consisting of Mo, Ni, Al, PtW, RhW, TiC, TiN, SiN, RuO, $Ru_2O$, and $Rh_2W$.

7. The apparatus of claim 1, further comprising:
   a tubular metal support, wherein
   the internal electrode is disposed on an inner surface of the metal support,
   the solid electrolyte is disposed on an outer surface of the metal support, and the external electrode is disposed on a surface of the solid electrolyte.

8. The apparatus of claim 1, wherein
   a joiner is disposed under the external electrode for insulation and sealing.

9. The apparatus of claim 8, wherein the joiner has both open sides allowing air to pass therethrough and has a cylindrical shape with an empty interior.

10. The apparatus of claim 8, wherein the joiner comprises an insulating portion and a metal tube.

11. The apparatus of claim 10, wherein the insulating portion comprises at least any one of alpha alumina, anodized metal, and enamel coated metal.

12. The apparatus of claim 10, wherein the insulating portion is joined by using at least any one of a welding method, an O-ring method, and a brazing method.

* * * * *